(12) United States Patent
McKibben

(10) Patent No.: US 11,647,407 B1
(45) Date of Patent: *May 9, 2023

(54) SYSTEMS AND METHODS FOR HYBRID QUANTUM WIRELESS COMMUNICATION NETWORK

(71) Applicant: CABLE TELEVISION LABORATORIES, INC, Louisville, CO (US)

(72) Inventor: Bernard McKibben, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 215 days.

This patent is subject to a terminal disclaimer.

(21) Appl. No.: 17/102,267

(22) Filed: Nov. 23, 2020

Related U.S. Application Data

(63) Continuation-in-part of application No. 16/215,056, filed on Dec. 10, 2018, now Pat. No. 10,848,997, which is a continuation of application No. 15/156,264, filed on May 16, 2016, now Pat. No. 10,187,814.

(60) Provisional application No. 63/111,787, filed on Nov. 10, 2020, provisional application No. 62/161,407, filed on May 14, 2015.

(51) Int. Cl.
*G06N 10/00* (2022.01)
*H04W 24/08* (2009.01)
*H04L 25/00* (2006.01)
*H04W 16/02* (2009.01)
*H04W 88/08* (2009.01)

(52) U.S. Cl.
CPC .............. *H04W 24/08* (2013.01); *H04L 25/00* (2013.01); *H04W 16/02* (2013.01); *H04W 88/085* (2013.01)

(58) Field of Classification Search
None
See application file for complete search history.

(56) References Cited

U.S. PATENT DOCUMENTS

| 9,501,747 B2 * | 11/2016 | Roy ........................ G06N 10/00 |
| 2007/0270658 A1 * | 11/2007 | Mitchell ................ G09B 23/28 |
| | | 600/300 |

(Continued)

*Primary Examiner* — Sai Aung
(74) *Attorney, Agent, or Firm* — Josh Snider

(57) ABSTRACT

A wireless communications system includes a feedback processing unit for analyzing captured bandwidth data from a remote radio head, and a problem-type processor in operable communication with the feedback processing unit. The problem-type processor is configured to (i) analyze the captured bandwidth data to determine whether the captured bandwidth data presents one of a computational polynomial time problem and a non-deterministic polynomial-time hard (NP-hard) problem, and (ii) transmit problem-specific data based on the determination. The system further includes a communications processor in operable communication with the problem-type processor. The communications processor is configured to process polynomial time problem data from the transmitted problem-specific data. The system further includes a quantum computer in operable communication with the problem-type processor. The quantum computer is configured to process NP-hard problem data received from the transmitted problem-specific data.

12 Claims, 10 Drawing Sheets

(56) References Cited

U.S. PATENT DOCUMENTS

| | | | | |
|---|---|---|---|---|
| 2008/0065573 | A1* | 3/2008 | Macready | G06N 7/08 706/19 |
| 2009/0121215 | A1* | 5/2009 | Choi | B82Y 10/00 365/162 |
| 2009/0144425 | A1* | 6/2009 | Marr | H04L 69/329 709/226 |
| 2011/0047201 | A1* | 2/2011 | Macready | B82Y 10/00 708/446 |
| 2014/0025606 | A1* | 1/2014 | Macready | G06N 5/003 706/14 |
| 2015/0199178 | A1* | 7/2015 | Shi | G06N 10/00 708/254 |
| 2016/0171368 | A1* | 6/2016 | Aspuru-Guzik | G06N 5/02 706/46 |
| 2016/0321559 | A1* | 11/2016 | Rose | G06N 10/00 |
| 2017/0177534 | A1* | 6/2017 | Mohseni | G06F 13/4068 |
| 2018/0165594 | A1* | 6/2018 | Ahn | G06N 10/00 |
| 2019/0019103 | A1* | 1/2019 | Dadashikelayeh | G06F 9/44 |
| 2020/0050959 | A1* | 2/2020 | Ashrafi | G06N 3/0635 |
| 2021/0133618 | A1* | 5/2021 | Cao | G06N 5/003 |
| 2022/0094609 | A1* | 3/2022 | Guntuku | H04L 41/149 |

\* cited by examiner

FIG. 6 - Detecting Signatures

FIG. 7 - Detecting Traffic Patterns

SYSTEMS AND METHODS FOR HYBRID QUANTUM WIRELESS COMMUNICATION NETWORK

RELATED APPLICATIONS

This application is a continuation-in-part of U.S. application Ser. No. 16/215,056, filed Dec. 10, 2018, and issuing as U.S. Pat. No. 10,848,997. U.S. application Ser. No. 16/215,056 is a continuation of U.S. application Ser. No. 15/156,264, filed May 16, 2016, now U.S. Pat. No. 10,187,814. U.S. application Ser. No. 15/156,264 claims priority to U.S. Provisional Application Ser. No. 62/161,407, filed May 14, 2015. The present application also claims priority to U.S. Provisional Application Ser. No. 63/111,787, filed Nov. 10, 2020. The subject matter and scope of all of these prior applications are incorporated by reference herein in their entireties.

BACKGROUND

Historically mobile networks have approach the use of spectrum in a number of different ways, and these approaches in part depended on the type of spectrum, e.g., exclusive use licensed spectrum, unlicensed spectrum, and non-exclusive use and multi-tiered priority incumbents. In some instances exclusive use licensed spectrum where only one network can exist in the band.

In other cases unlicensed spectrum is used, for example in regions of the world where there is no regulated or enforced protocol for unlicensed spectrum use. One examples of a network behavior in the unlicensed bands, which may result in interference and reduced performance, is a network designed for coexistence. One such example is Wi-Fi, which first sense a frequency channel for energy prior to transmitting. Alternatively, a network may sense certain MAC layer parameters for networks utilizing the same technology, but not across technologies. A network may assign one or more channels and applies traffic to one of those channels based on a determination, during the energy sensing process, that there is no energy detected on the channel. If energy is detected on a channel the network may back off for a period of time and attempt a transmission at a later time. Alternatively, a network may simply apply traffic to a band or channel with a configured duty cycle to avoid transmission collations. Still other networks may utilize frequency hopping to avoid interference.

In non-exclusive use and multi-tiered priority incumbent systems, a network polls a database for incumbent use or to determine an exclusion zone to determine if a band is available or not. If no higher priority incumbents are detected in this process, the network may apply traffic on the processed band.

Prior approaches for shared spectrum, as listed above, create interference and do not exploit underutilized spectrum in an efficient manner. The use of conventional computing does not afford the operator (1) the ability to detect both the PHY and MAC layers of other network types across wide bands of spectrum, (2) determine the regulatory priority of other networks in the band, (3) recognize traffic patterns of other networks and (4) dynamically assign frequencies and channels to mobile devices accordingly.

What is needed is a method for mobile networks to detect the PHY and MAC signatures of incumbent priority networks and other networks across wide bands of spectrum in order to assign their mobile devices to underutilized spectrum without creating interference, and without the need to poll databases or avoid exclusion zones. The network should be able to assign aggregated traffic channels to mobile devices using a set of non-contiguous frequency bands.

SUMMARY OF THE INVENTION

In an embodiment, a hybrid quantum-conventional computational system advantageously allocates resources in a wireless communication system. The present system is formed with a feedback processing unit which analyzes band capture data and determining if an optimized resource management solution is a non-deterministic polynomial-time hard (NP-hard) or a polynomial time problem. The system further includes a conventional computing system for processing the polynomial time problem and a quantum computing system for processing the NP-hard problem. The quantum computing system receiving qubit data from a quadratic unconstrained binary optimization (QUBO) unit for translating conventional binary data to quantum bits (qbits). A problem-type processor transmits the binary NP-hard problem data to the QUBO for translation into qbit data for processing by the quantum computing system and for transmitting the polynomial time problem to the conventional computing system.

In an embodiment, a wireless communications system includes a feedback processing unit for analyzing captured bandwidth data from a remote radio head, and a problem-type processor in operable communication with the feedback processing unit. The problem-type processor is configured to (i) analyze the captured bandwidth data to determine whether the captured bandwidth data presents one of a computational polynomial time problem and a non-deterministic polynomial-time hard (NP-hard) problem, and (ii) transmit problem-specific data based on the determination. The system further includes a communications processor in operable communication with the problem-type processor. The communications processor is configured to process polynomial time problem data from the transmitted problem-specific data. The system further includes a quantum computer in operable communication with the problem-type processor. The quantum computer is configured to process NP-hard problem data received from the transmitted problem-specific data.

BRIEF DESCRIPTION OF THE INVENTION

These and other features, aspects, and advantages of the present disclosure will become better understood when the following detailed description is read with reference to the following accompanying drawings, in which like characters represent like parts throughout the drawings.

Figure 1:
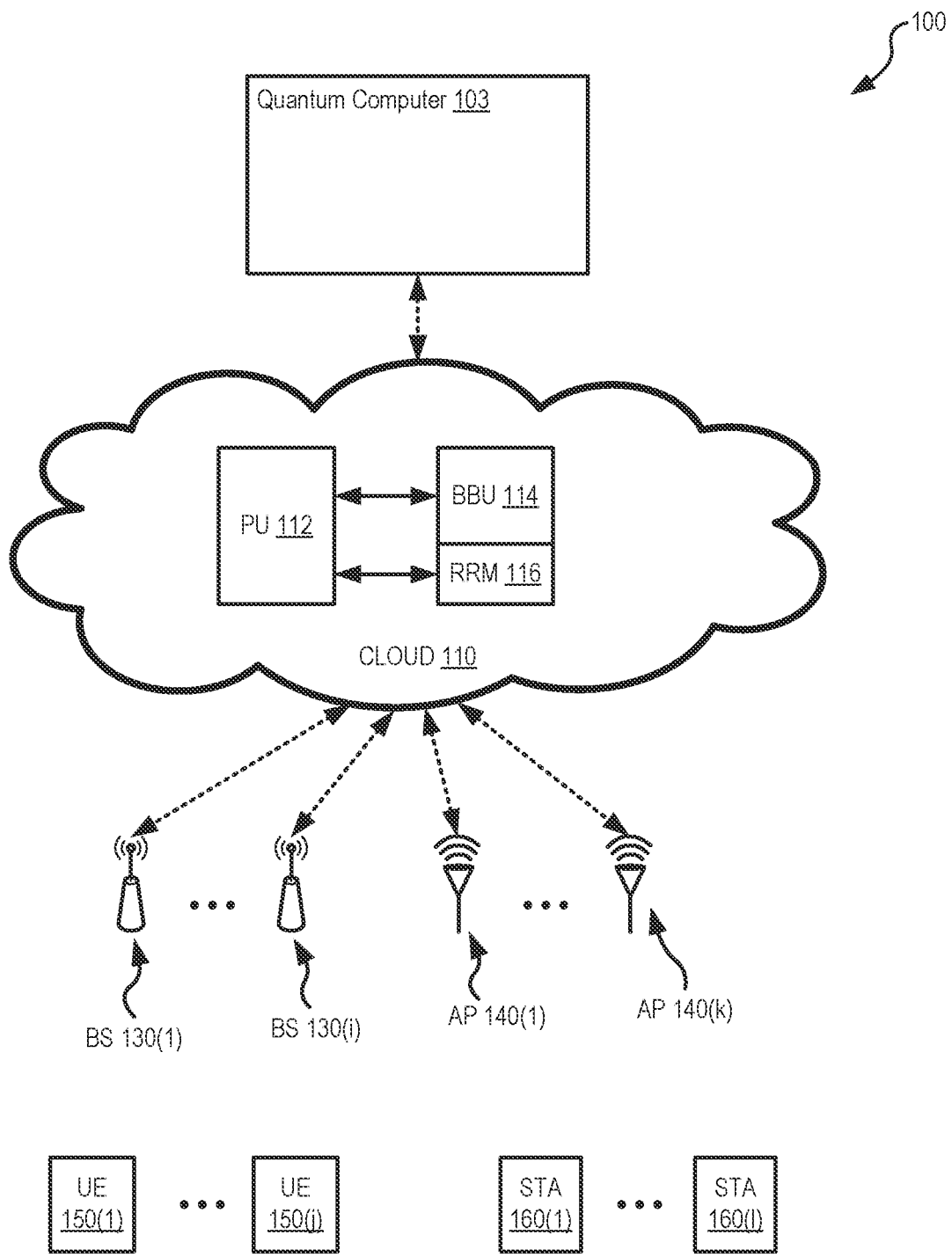
FIG. 1 shows one hybrid computing system associated with a cloud Radio Access Network (RAN) network, in an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION OF THE FIGURES

In the following specification and the claims, reference will be made to a number of terms, which shall be defined to have the following meanings.

Acronyms, abbreviations, and initialisms:
RRH—remote radio head
BBU—base band unit
BS—base station
AP—access point
MIMO—multiple input multiple output
RAN—radio access network
STA—station
PU—processing unit
Qbit (also called qubit)—a quantum bit
LTE—long-term evolution
HFC—hybrid fiber-coax
NP-hard (problem)—non-deterministic polynomial-time hard (problem)
MINLP—mixed integer nonlinear problem
QSAP—quadratic semi-assignment problem
QUBO—quadratic unconstrained binary optimization Additionally, the singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

A hybrid quantum-convention computing architecture combines the benefits of a quantum computing system and a conventional computing system as applied to the dynamic allocation of frequency for communication systems, for example, wireless communication systems. The present system and method may be applied across wide band set of exclusive use spectrum bands, licensed non-exclusive use spectrum bands, and/or unlicensed spectrum bands.

One objective of the present system and method is to provide mobile operators with the capability to use under-utilized spectrum in order to deliver broadband wireless service having near zero interference with other networks occupying the band. In an embodiment, all spectrum processed by the present hybrid architecture may be fully utilized. The present hybrid architecture is configured to detect signatures associated with a plurality of networks, systems, and devices in, for example, one or more shared spectrum band, either licensed or unlicensed. Detecting signatures may be done on a continual basis or near continuous basis. Furthermore, the present system and method may deterministically assign one or more frequencies to mobile devices based upon, for example, current use and any regulatory network priority assigned to the signature(s). Frequencies are assigned in real-time as networks, for example incumbent networks and non-incumbent networks, sharing the band alter band utilization. In the present system and method there is no need for a mobile network to access a centralized databases for incumbent band utilization as is currently done, or to strictly adhere to exclusion zones occupied by lower utilized, high priority incumbents.

FIG. 1 shows one exemplary hybrid quantum-conventional system 100 associated with a cloud Radio Access Network (RAN) network.

System 100 includes a quantum computer system 103, a conventional cloud processing system 110, a plurality of base stations (BS) 130(1)-130(i), a plurality of access points (APs) 140(1)-140(k), a plurality of user equipment devices (UEs) 150(1)-150(j), and a plurality of stations (STAs) 160(1)-160(l).

Cloud system 110 further includes a processing unit (PU) 112 in communication with a base band unit (BBU) 114 and a radio resource management system (RRM) 116. Cloud system 110 may also include or be in communication with a data store (not shown). In an embodiment, cloud processing system 110 is a plurality of cloud processing systems 110(1)-110(q). A generic term used herein for both BSs 130 and APs 140 is remote radio head (RRH), as known in the art.

A base station, like BSs 130, is an LTE/cellular specific implementation of a remote radio head. An access point, like APs 140, is Wi-Fi specific implementation of a remote radio head. As such remote radio head is used herein to describe base stations 130, access points 140, and other types of remote radio heads herein. In an embodiment remote radio heads support a plurality of technologies such that one remote radio head is configured with at least an LTE/cellular bastions and a Wi-Fi access point. The remote radio heads are in communication with cloud 110. Communication may be wired, optical, wireless, or a combination thereof, e.g. HFC.

User Equipment, like UEs 150, is an LTE/cellular specific implementations of a client. A station, like STAs 160, is Wi-Fi specific implementation of a client. As such client is used herein to describe UEs 150, STAs 160, and other types of technology specific clients herein. Clients, such as UEs 150 and STAs 160, may be in wireless communication with one or more remote radio heads, such as BSs 130 and APs 140. Some clients may support a plurality of communication technologies such that a single client may be in communication with more than one remote radio head and may communicate simultaneously across technologies. For example, UE 150(1) may support both LTE and Wi-Fi such that, for example, UE 150(1) simultaneously communicates with BS 130(1) and AP 140(1), and UE 150(2) simultaneously communicates with BS 130(1)-(3) and APs 140(2)-(6).

For dynamic frequency allocation, remote radio heads scan and sample wide spectrum band ranges, for example, from 400 Mhz to 100 Ghz. The samples are sent to the conventional cloud 110 processing unit 112 and the quantum computing 103.

Quantum computers are well suited for pattern recognition and solution optimizations. As such quantum computer 130 is utilized in the present system to identify network signatures (also called herein "patterns" and "waveforms") in the captured band data. Each wireless network generates a unique waveform or signature which may include or support, for example, certain channel frequency, multiple access methodologies (TDMA, CDMA, OFDMA, etc.), modulation coding schemes, system specific MAC layers, etc. Quantum computer 103 is capable of detecting and distinguishing each signature present within a band. Quantum computer 103 processes samples continuously, for example, every 100 ms. This is shown and discussed in greater detail in FIG. 5 and its associated description, below. By doing so quantum computer 103 is capable of identifying the network present in shared spectrum bands (licensed or unlicensed), and traffic patterns present in the band over multiple samples. This then allows quantum computer 103 to optimize channel selection for the operator's network and mobile devices transmissions.

Quantum computer 103 sends the identified network signature(s), traffic pattern(s) and recommended channel selection(s) to the conventional computing system, cloud 110. Cloud 110 then assigns priority to each network based upon, for example, regulations. Cloud 110 then performs a waveform adaptation to the selected set of frequencies to each of its mobile devices based upon the networks and traffic patterns identified by quantum computer 103. Cloud 110 then manages the baseband functions for uplink and downlink channels to its associated mobile devices, e.g., UEs 150 and STAs 160, until cloud 110 receives its next input from the quantum computer.

A quantum computer may be advantageously used in the present system and method to identify PHY and MAC signatures of a variety of networks, to identify traffic patterns from a variety of networks, to link cognitive radios to quantum computers in order to identify network signatures, to apply quantum computing process to a cloud RAN architecture applied to spectrum sharing, and for cooperation with a conventional computer, such as conventional cloud computing system 110, to dynamically assign frequencies to mobile devices/clients. Hybrid Conventional and Quantum Based Architecture for Heterogeneous Wireless Networks:

The present system, as shown in FIG. 1, may be advantageously utilized in a heterogeneous wireless network, as described here, by coupling a conventional computing system with a quantum computing system. Such a system and its associated methods may be arranged to provide an analysis of the various complex factors that impact wireless deployments for the purpose of enabling real-time radio global resource management and optimization decisions for heterogeneous wireless networks.

A heterogeneous network is configured with one or more remote radio heads, such as macro base stations (e.g., BS 130), residential and public access points (e.g., APs 140), as well as femto cells and/or any other pre-planned or unplanned element in the radio access network. These enable connectivity to the end points, referenced as user equipment. Examples include mobile phones, tablets, computers etc.

Quantum computer 103 is in communication with the cloud system 110, creating a hybrid quantum-conventional computing system. The advantages of this hybrid quantum-conventional computing architecture include:

Computational problems in the present hybrid system may be directed to the processing system (quantum or conventional), based on which processing system is best suited to tackle the particular problem or aspect of the problem. For example, a quantum processing systems are better suited for non-deterministic polynomial-time hard (NP-hard) problems, while conventional computational systems are for polynomial time problems (see below for additional details). This can minimize processing cost and setup, and enable an organic progression from conventional to quantum computing.

Enabling the effective use of advancements in machine-learning and deep-learning techniques for predictive wireless network operations Overcoming real-time constraints (e.g., processing time) imposed by quantum computers by converting a NP-hard computing problem into a linear storage problem, via the use of "profiles" (see below).

Adapting a hybrid quantum-conventional computing system into a wireless network in this way produces an adaptable, intelligent, heterogeneous wireless network. To better understand this, we provide information on radio resource management parameters in the next section.

Radio Resource Management Parameters:

Device selected transmission parameters not only impacts the devices performance but may also influence the performance of other devices that utilize the same radio access technology and/or different radio access technology. Example of such parameters include but are not limited to power level, operation channel, and transmitted waveform. For globally optimum performance it can be advantageous to have a "centralized" entity with sufficient information regarding all discoverable network elements, the different radio access technologies, and their operating conditions. Such a centralized entity can optimally choose the transmission parameters of the network elements in the radio access network. In addition, the centralized entity may also perform signal processing on a multiplicity of signal data received from the network elements that lead to a globally optimum performance. That is, the centralized entity may by itself or jointly with associated computational elements, determine the transmit signal characteristics for multiplicity of RAN elements.

The parameters chosen by elements in the radio access network are adapted either on a short time scale, for example in the order of a transmission frame time, or are adapted on a longer time scale, for example in the order of seconds or minutes. Examples of short time scale parameters include, but are not limited to, a transmitted waveform communicated between the $i^{th}$ base station and the $j^{th}$ UE, which is denoted as $S_{ij}(t)$ in FIG. 2. Examples of long term scale parameters include, but are not limited to, base station transmit power ($P_i$) and resources allocated to the base station ($C_{ij}$), see FIG. 2.

$S_{ij}(t)$, ($P_i$) and $C_{ij}$ are communicated between RRMs 130, 140 and cloud 110 for processing. In an embodiment, $S_{ij}(t)$ is processed by BBU 114 and ($P_i$) and $C_{ij}$ are processed by RRM 116.

Figure 2:
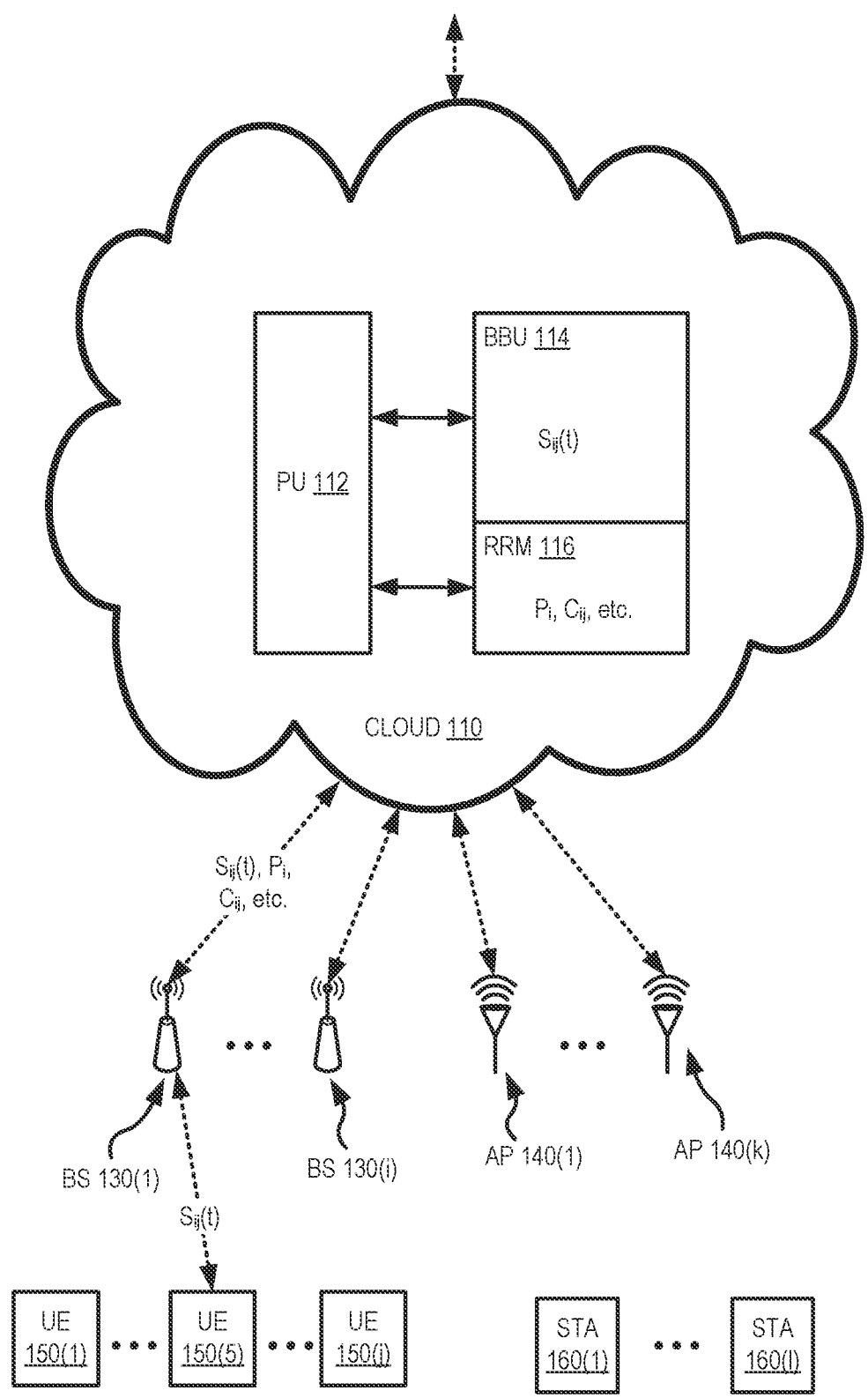
FIG. 2 shows the non-quantum portion of the hybrid computing system in a cloud RAN network from FIG. 1, in an embodiment.
Figure 3:
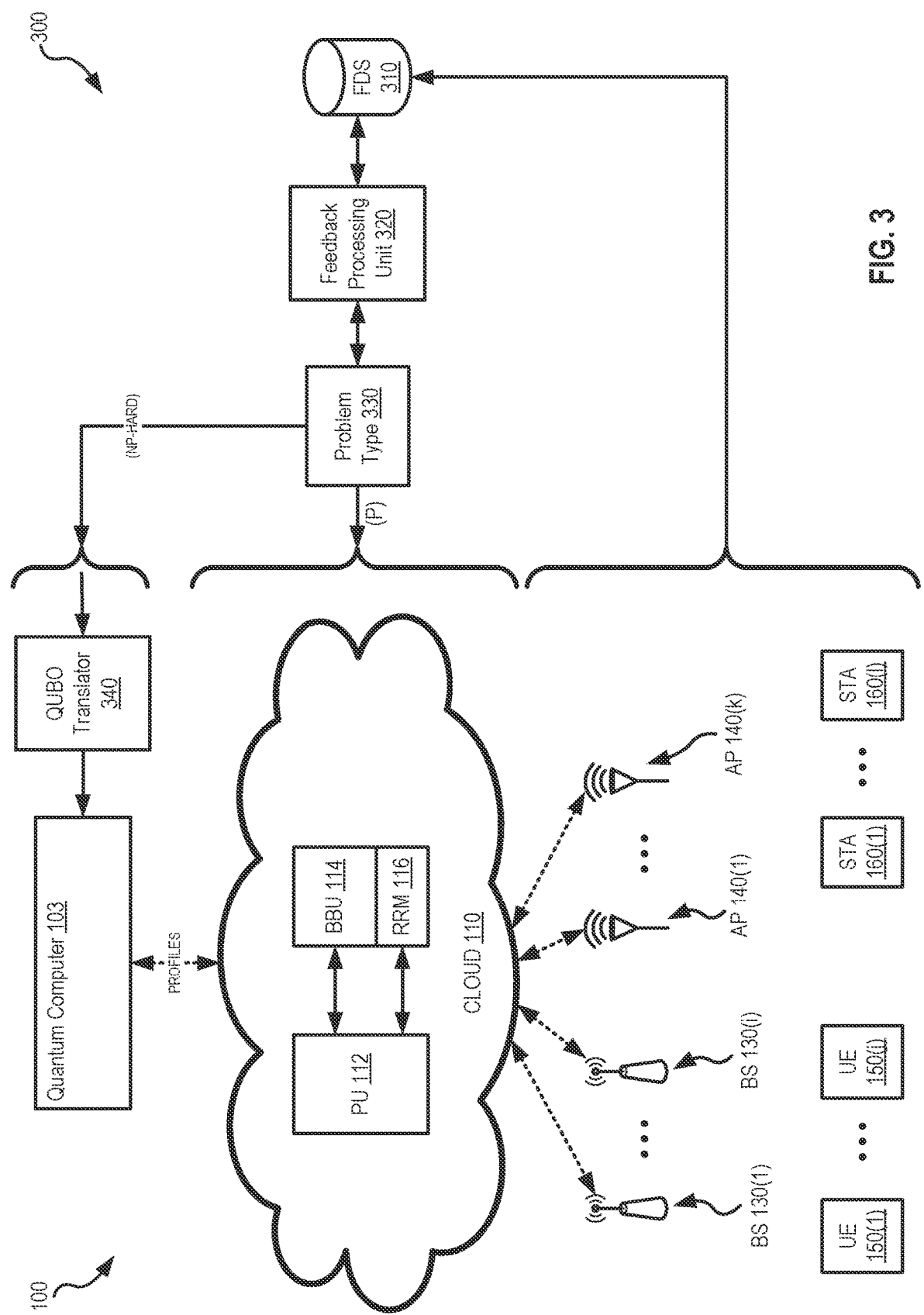
FIG. 3 shows the hybrid computing system in a cloud RAN network from FIG. 1 with the addition of a feedback flow, in an embodiment.

The design of a wireless network, such as that shown in FIGS. 1, 2, and 3, is dependent on various factors, such as the geography, population density, anticipated wireless sessions, etc. In addition to these static data points, wireless networks can be designed to take into consideration dynamic factors, such as real-time traffic patterns, weather, location specific data (e.g., terrain, altitude, orientation of a UE), etc. Designs may even take into consideration the movement of UEs at any given time. All of this can be done utilizing predictive analysis based on macro trends (e.g., traffic patterns, etc.) and micro-trends (e.g., user schedules, user travel based on map software, etc.). This data is available on many UEs today. All that is needed is to process the micro and macro trends effectively and in real-time, although such processing is an NP-hard problem. NP-hard problems are a challenge for conventional computers to compute in realistic time frames (see below). The present system and method takes into considerations and sends NP-hard problems to the quantum computational aspect of the present system, such as quantum computer 103, and polynomial time problems are sent to a conventional computer system, such as cloud 110.

FIG. 3 is a feedback processing system 300 shown in block diagram format. System 300 includes a feedback data store, (FDS) 310, a feedback processing unit (FPU) 320, and a problem type processor 330. FDS 310 is used to collect data from the various sources. The collected data includes real-time performance data from the network, user profile data, and various external data, such as weather data, location data, traffic data, etc.

FPU 320 receives the data from FDS 310 and pre-analyzes the data and cooperates with problem type processor 330 to determine if and how to split the data for quantum processing or conventional processing. The former results in new or refined network profiles. The latter results in a selection among the existing profiles, for example, which already exist in cloud 110. If FDU 320 and problem type processor 330 determine that a problem is a polynomial time problem (P-type problem) that problem is sent to the conventional computer system, such as cloud 110. If the problem is determined to be an NP-hard problem, that problem is sent to the quantum computing system, such as quantum computing system 340.

In an embodiment, an NP-hard problem is translated into a special kind of NP-hard problem call QUBO (quadratic unconstrained binary optimization) in a polynomial time, It will be understood by one skilled in the art that NP-hard problems may be translate to a different NP-hard problem in polynomial time, which are amenable to be solved by quantum computational processes. Optional QUBO translator 340 is shown connecting problem type processor to quantum computer 103 is FIG. 3.

Figure 4:
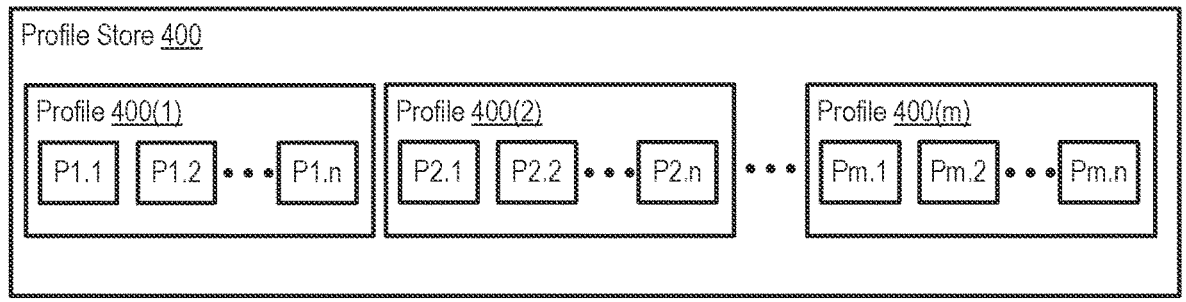
FIG. 4 is a block diagram illustrating one exemplary profile set, in an embodiment.

Network Profiles:

As previously discussed, embodiments herein utilize quantum computer systems and architecture for solving computationally complex problems for predictive wireless network configurations. However, this requires the quantum computer systems do perform real-time processing. Real-time processing in quantum computer systems is both very expensive and currently very challenging since quantum computers suffer from delays associated with annealing, which result in a less than-desired latency. To rectify this, the present system and method utilizes the quantum computer system to (1) create network configuration profiles and (2) refine or create additional sub-profiles. FIG. 4 is a block diagram illustrating one exemplary profile set, in an embodiment. Profiles are pictorially represented in FIG. 4 as stored profile store 400. Profile store 400 includes a plurality of profiles profile 400(1) through profile 400(m), each of which includes sub-profiles. Profile 400(1) includes sub-profiles P1.1 through P1.n, profile 400(2) includes sub-profiles P2.1 through P2.n, and profile 400(m) includes Pm.1 through Pm.n.

In one example of profiles and sub-profiles, profile 400(7) may be for a time interval 7a-8a, and profile 400(8) may be for a time interval 8a-9a. Sub-profile P7.1 may be for a first snow sub-profile, sub-profile P7.2 may be for a second snow sub-profile, sub-profile P7.3 may be for a first rain sub-profile, etc. More complex sub-profiles may be formed as the combination of other sub-profiles. For example a sub-profile may be formed by combining a first snow sub-profile, a rush hour traffic sub-profile, a peak sunspot sub-profile, etc. As can be seen, any aspect that can effect RF transmission may be quantified into a sub-profile. In addition, the degree of orthogonality between sub-profiles may also be quantified and included in a sub-profile that is the combination of other sub-profile or sub-profile aspect(s).

The present system and method generates network configuration profiles, for example, one for each different combination of the various static and dynamic factors (e.g., anticipated traffic patterns, weather, sunspots, etc.), for the different network configuration scenarios that are consider. It also generates sub-profiles to handle potential real-time changes within the scope of a specific profile. One example of a sub-profile is one that takes into consideration a traffic accident on a major artery such that a road closure occurs. These sub-profiles are designed to cover a certain percentage of plausible conditions (e.g., 90%) for an associated profile. Additional sub-profiles may be generated or refining existing sub-profiles, e.g., based on new information as it becomes available. For instance, as traffic patterns change, city landscape changes, weather changes, etc.

Description of NP-Hard-Ness of the Problem:

The problem of optimum resource allocation among the RAN elements using a centralized coordinator translates to a mixed integer nonlinear problem (MINLP) when the number of coordinated RAN elements is small and to a quadratic semi-assignment problem (QSAP) when the number of coordinated RAN elements is relatively large. Both of these problems are NP-hard problems. In other words, the computation time to find the optimum value for the aforementioned optimization problem exponentially grows with the number of decision variables. Even using conventional computers with multi-core processors is not sufficient for solving these problems and requires length processing times, resulting in long processing delays. This will be problematic especially for applications that require real-time or semi real-time processing. Quantum computers on the other hand are highly optimized to solve the NP-hard problems. Although due to physical constraints, there is a minimum processing delay to solve these problems, the amount of delay is bounded and does exponentially grow with the size of problem.

As discussed previously, the optimization problem can be divided into two separate problems: a first aspect that is not NP-hard but may still require some substantially real-time adaptation (e.g., transmitted waveform adaptation) and a second (or more) aspect that is NP-hard but the where the optimal solution varies more slowly with time (e.g., adaptation of power, operation channel, carrier sense threshold, etc.). Conventional computers may be used to solve the former while quantum computer can be used to solve the latter problem.

Figure 5:
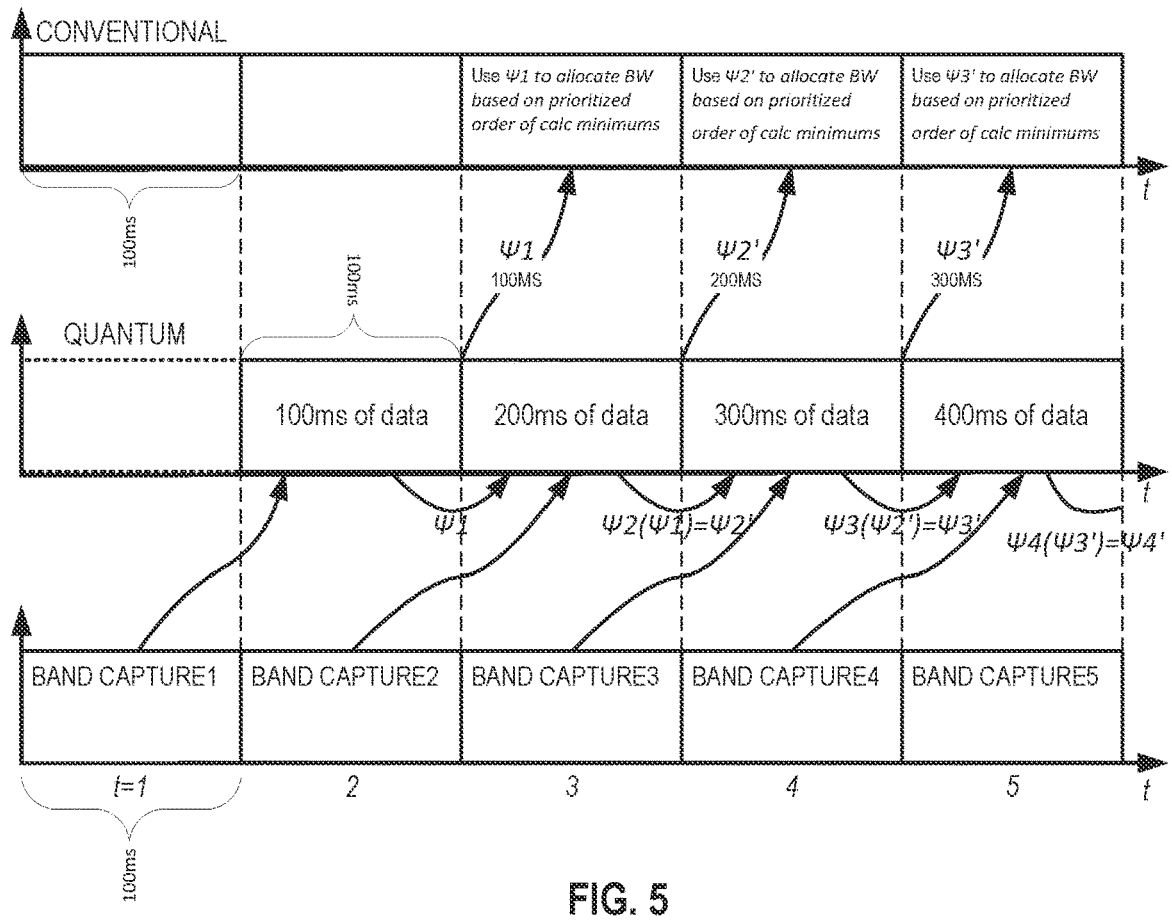
FIG. 5 is a processing diagram showing band capture, quantum processing, and convention processing, in an embodiment.

FIG. 5 is a processing diagram 500 showing band capture, quantum processing, and convention processing, in an embodiment. Processing diagram 500 is divided into 5 processing steps, each 100 ms in length. 100 ms is selected here as an exemplary amount for a quantum computing system to produce a processing result.

The basic process includes capturing 100 ms of data, processing the band captured data by the quantum computing system to generate a minimum or set of minimums, for example, MIMO coefficients for minimum noise, then send the results to the conventional computing system to allocate bandwidth. It will be understood that the minimum or set of minimums may be local minimums or may be global minimums. Prior to or during the transmission to the quantum computing system the data may be translated from a convention n by m matrix into a x by y qubit matrix. Prior to or during the transmission from the quantum computing system to the conventional computing system the data may be translated from a x by y qubit matrix back to a convention n by m matrix.

At time step t=1 a band capture system captures band capture 1. Band capture 1 data is sent to the quantum processing unit and in time step t=2 the band capture system captures band capture 2 and the quantum processing system generates a minimum or set of minimum MIMO coefficients for minimum noise packaged as $\Psi_1$. Band capture 2 data is then sent to the quantum computing system and a copy of $\Psi_1$ is then sent to the conventional computing system. A copy of $\Psi_1$ is also saved within the quantum computing system for processing with results from quantum computing system processed band capture 2 data.

The band capture system, at time step t=3, captures band capture 3 data. The quantum computing system, at time step t=3, processes band capture data 2 to generate $\Psi_2$ as a function of $\Psi_1$ to produce $\Psi'_2$, that is: $\Psi_2(\Psi_1)=\Psi'_2$. Thus the quantum computing system has processed 200 ms of data at time step t=3. By processing the current set of minimum MIMO coefficients as a function of historical data the most recent data may converge more quickly to the best solution as time goes on. The conventional computing system, at step t=3, allocated bandwidth data based on the $\Psi_1$ data. Band capture 3 data is then sent to the quantum computing system and a copy of $\Psi'_2$ data is sent to the conventional computing system.

The bandwidth capture system, at time step t=4, captures band capture 4. The quantum computing system, at time step t=4, processes band capture data 3 to generate $\Psi_3$ as a function of $\Psi'_2$ to produce $\Psi'_3$, that is: $\Psi_3(\Psi'_2)=\Psi'_3$. Thus the quantum computing system has processed 300 ms of data at time step t=4. The conventional computing system, at step t=4, allocated bandwidth data based on the $\Psi'_2$ data. Band capture 4 data is then sent to the quantum computing system and a copy of $\Psi'_3$ data is sent to the conventional computing system.

The bandwidth capture system, at time step t=5, captures band capture 5. The quantum computing system, at time step t=5, processes band capture data 4 to generate $\Psi_4$ as a function of $\Psi'_3$ to produce $\Psi'_4$, that is: $\Psi_4(\Psi'_3)=\Psi'_4$. Thus the quantum computing system has processed 400 ms of data at time step t=5. The conventional computing system, at step t=5, allocated bandwidth data based on the $\Psi'_3$ data. Band capture 4 data is then sent to the quantum computing system and a copy of $\Psi'_3$ data is sent to the conventional computing system.

In an alternative embodiment, the quantum computing system only processes the most recent band capture data.

In still another embodiment, the quantum computing system processes data as described above for FIG. 5, and additionally processes the most recent band capture data for error correction purposes.

Figure 6:
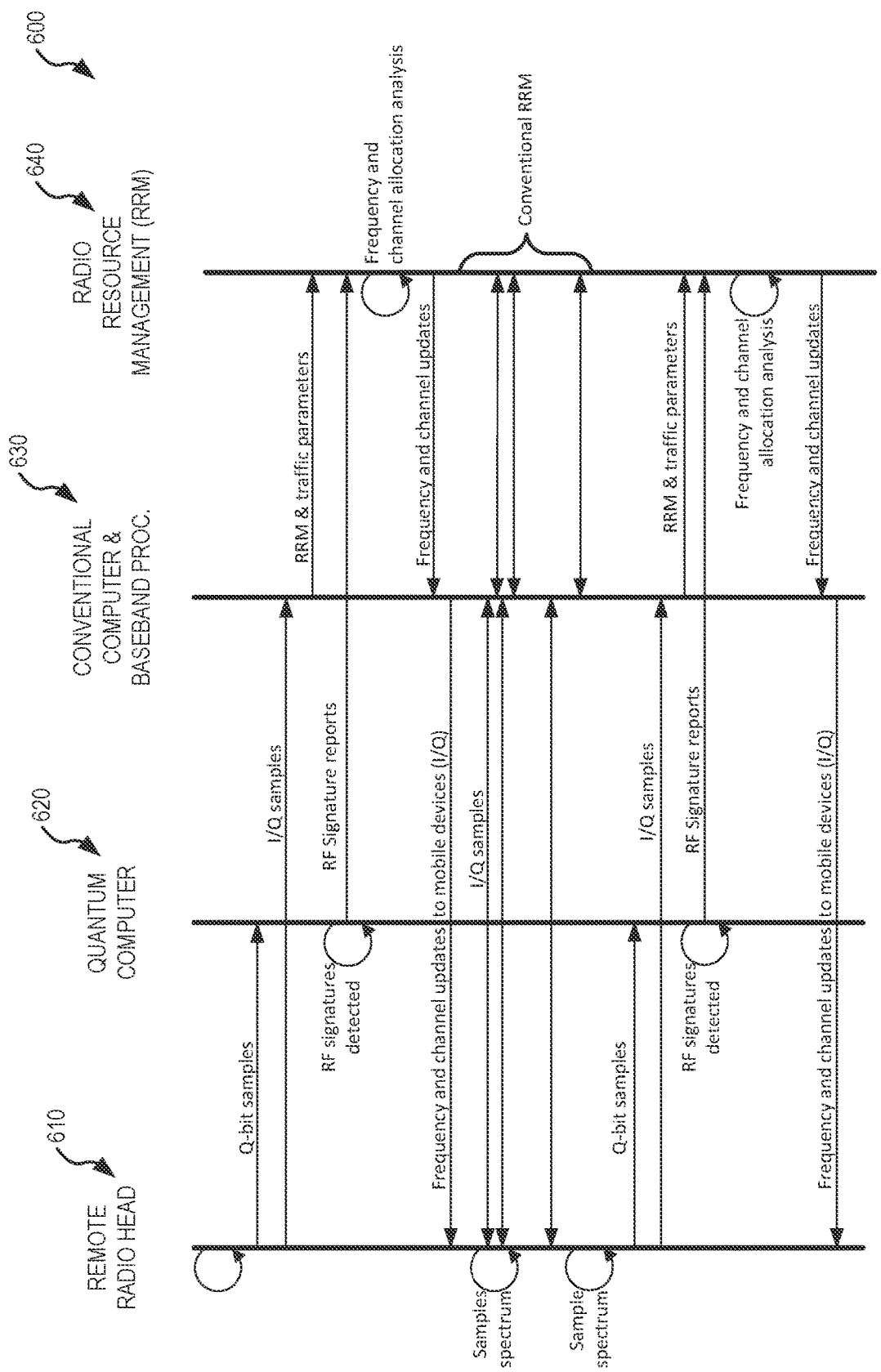
FIG. 6 is a communication diagram in a signal detection embodiment.

FIG. 6 is a communication diagram 600 in a signal detection embodiment. Communication devices in FIG. 6 include a remote radio head (RRH) 610, a quantum computer 620, a conventional computer implemented with baseband processor 630, and a radio resource management 640. In system 600 time increases from the top of the communication diagram to the bottom of the diagram.

First, the remote radio head transmits Qbit samples to the quantum computer and I/Q samples to the conventional computer. The conventional computer then transmits RRM and traffic parameters to the RRM. The quantum computer then detects the RF signatures from the Qbit samples and sends an RF signature report to the RRM. The RRM performs a frequency and channel allocation analysis and reports RRH with the frequency and channel update data for its associated mobile devices, (see FIG. 1).

The RRH then samples the spectrum and communicates I/Q samples to the conventional computer, which communicates with the RRM system in the conventional manner.

The RRH then provides Qbit samples to the quantum computer and I/Q samples to the conventional computer. The conventional computer transmits RRM and traffic parameter data to the RRM. The quantum computer again detects RF signatures and reports the RF signatures to the RRM, which performs a frequency and channel allocation analysis and transmits frequency and channel updates to the conventional computer. The conventional computer then transmits the frequency and channel updates to the RRH for use with its associated mobile devices.

Figure 7:
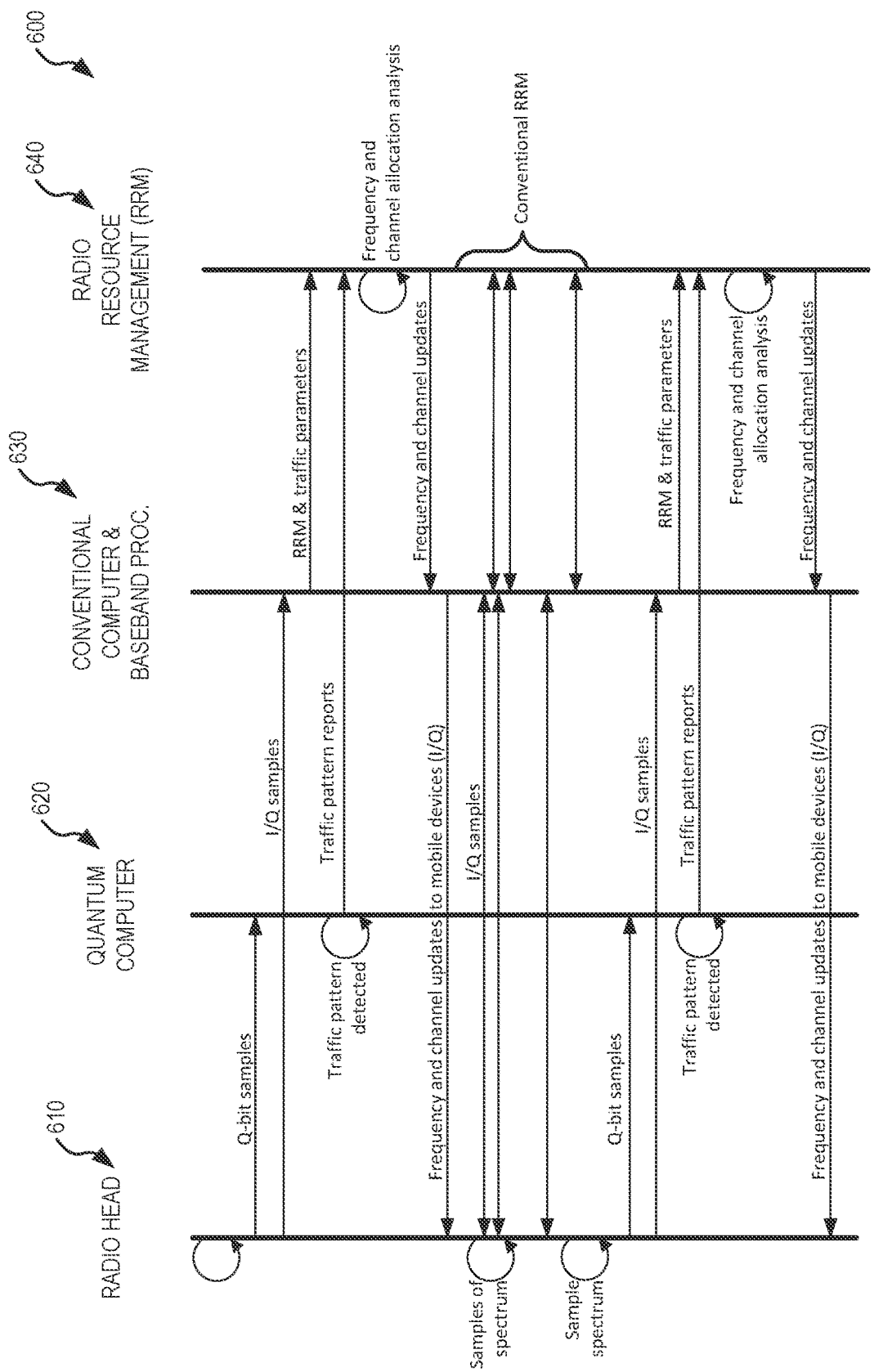
FIG. 7 is a communication diagram in a traffic pattern detection embodiment.

FIG. 7 is a communication diagram 700 in a traffic pattern detection embodiment. Communication devices in FIG. 7 include remote radio head (RRH) 610, quantum computer 620, conventional computer implemented with baseband processor 630, and radio resource management 640. In system 700 time increases from the top of the communication diagram to the bottom of the diagram.

First, the remote radio head transmits Qbit samples to the quantum computer and I/Q samples to the conventional computer. The conventional computer then transmits RRM and traffic parameters to the RRM. The quantum computer then detects the traffic patterns from the Qbit samples and sends a traffic pattern report to the RRM. The RRM performs a frequency and channel allocation analysis and reports RRH with the frequency and channel update data for its associated mobile devices, (see FIG. 1).

The RRH then samples the spectrum and communicates I/Q samples to the conventional computer, which communicates with the RRM system in the conventional manner.

The RRH then provides Qbit samples to the quantum computer and I/Q samples to the conventional computer. The conventional computer transmits RRM and traffic parameter data to the RRM. The quantum computer again detects traffic patterns and reports the traffic patterns to the RRM, which performs a frequency and channel allocation analysis and transmits frequency and channel updates to the conventional computer. The conventional computer then transmits the frequency and channel updates to the RRH for use with its associated mobile devices.

Mobile Network Radio Control Applications for Quantum Computing

Referring back to FIG. 3, the combination of wireless technologies depicted therein (e.g., BBU 114, RRM 116, BSs 130, APs 140, UEs 150, STAs 160) are shown above to provide greater reach of the mobile network fewer base stations. Such combinations of different technologies though, necessarily increase the complexity and choice of selecting the correct beams, mesh network, and/or reflectors that will optimize the use of network resources for the desired user throughput. More particularly, the increased complexity of the network creates multiple additional communication paths.

It is therefore desirable to develop efficient techniques for convergence upon optimal path solutions, namely, how to select the best path from the multiple paths available, but while still increasing system performance and reducing costs. Conventional techniques for modeling such optimal path solutions, which have utilized only conventional computer systems, have been considerably inefficient.

Accordingly, the following embodiments describe systems and method for further adapting the above hybrid quantum computing solutions to the spanning tree challenges to solving the optimal path selection problems of complex mobile radio networks. For example, with the innovative inclusion of additional system components, the conventional computer portion of the hybrid system may be used to model the mobile network environment, and the quantum computer portion of the hybrid system may use this model to more efficiently solve the spanning tree problem to determine optimum paths. Through these advantageous techniques, the above hybrid conventional/quantum computer may be applied to a mobile network to achieve efficient optimization results that are not realized by conventional computer system techniques alone.

Figure 8:
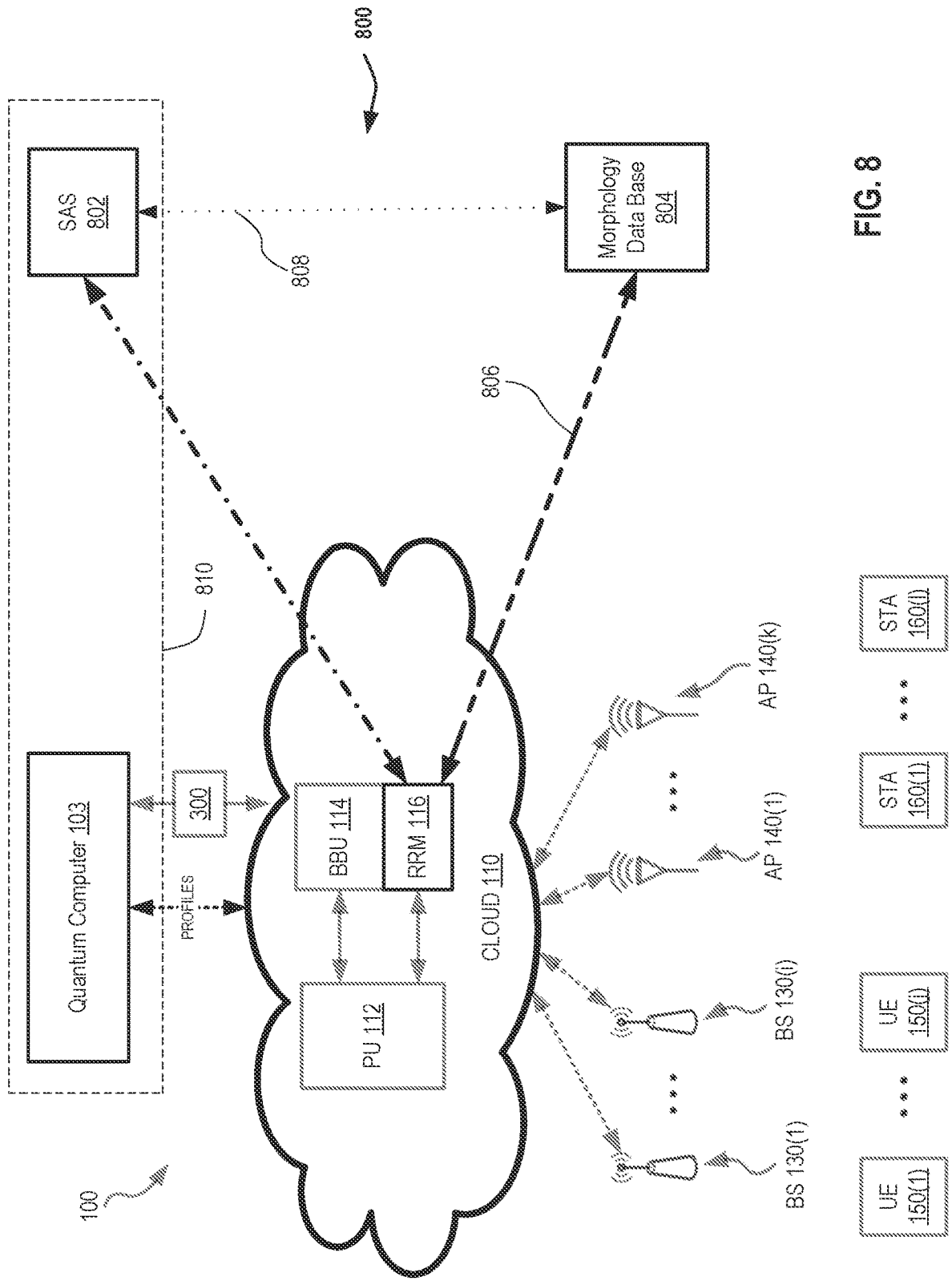
FIG. 8 is a schematic illustration of a network control system for the hybrid computing system depicted in FIG. 1.

FIG. 8 is a schematic illustration of a network control system 800 for hybrid computing system 100, FIG. 1. In an exemplary embodiment, network control system 800 may further include feedback processing system 300, FIG. 3. For ease of explanation, it may be assumed that the several components of hybrid computing system 100 and feedback processing system 300 may have substantially the same structure and function with respect to network control system 800.

In the exemplary embodiment, network control system 800 includes a Spectrum Access System (SAS) 802 in operable communication with RRM 116. SAS 802 operates to assign spectrum to multiple separate wireless networks that share the same spectrum within a common location area. Procedures governing SAS allocation are often regulated by government rules. SAS assignments are conventionally made at a very high level, and are therefore not considered to provide, by themselves, sufficient radio resource management of interference avoidance. That is, SAS assignments are generally considered to be a first crude, lower resolution step in the spectrum management process.

However, as shown in FIG. 8, the addition of SAS 802 to hybrid computing system 100 (which also may include feedback processing system 300) greatly reduces the computational complexity, and at both the conventional computer portion (e.g., Cloud 110) and the quantum computer portion (e.g., quantum computer 103). SAS implementation represents a relatively recent development for shared spectrum access for dividing the available spectrum across multiple networks, which are typically managed by different network operators, who do not necessarily easily communicate with one another.

Exemplary architectural configurations and modeling techniques using an SAS are described in greater detail in U.S. Pat. No. 10,367,577, the disclosure thereof which is incorporated by reference herein in its entirety. The embodiments herein are drawn to techniques for using the crude, first order level modeling and data provided by SAS 802 to reduce the NP-hard problem (e.g., for spanning tree and path optimization) across the entire spectrum monitored and managed using SAS 802. This reduction to the overall NP-hard problem thus also greatly reduces the computational complexity for the conventional computer as well.

In an exemplary embodiment, the conventional computing system (e.g., Cloud 110) receives the first order SAS spectrum allocation information from SAS 802, e.g., through RRM 116, and then uses this received information as an overall spectrum template for which the hybrid system may then specifically allocate the actual resources of the network. That is, similar to the embodiments described above, the computational problems are directed to the respective quantum or conventional processing system based on which processing system is best suited to tackle the particular problem or aspect thereof. In the exemplary embodiment, the conventional computational system utilizes SAS 802 to model the mobile network environment similarly to the polynomial time/P-type problem solutions described above, and the quantum processing system solves the path optimization and spanning tree problems similarly to the non-deterministic polynomial-time hard/NP-hard problem solutions described above.

In an exemplary embodiment, network control system 800 may further include a morphology data base (MDB) 804, which functions to provide coverage area morphology data and/or a morphology model to system 800. In some embodiments, MDB 804, similar to SAS 802, has a substantially direct communication path 806 to RRM 116. Alternatively, MDB 804 provides information to system 800 indirectly through SAS 802 over an indirect communication path 808.

In the exemplary embodiment, MDB 804 provides an additional model to system 808 that accounts for such considerations as radio head placement, phased array antennas, MIMO, passive reflectors, active reflectors, wireless relays and mesh (IAB) techniques, morphology, and/or morphology updates reported by mobile devices. Additional morphology data from MDB 804 may include, without limitation, geographical topography, as well as civil and RF propagation compatibility information, which is a primary feature of RF network planning and simulation tools. MDB 804 thus enables the insertion of three-dimensional topology data (e.g., hills, buildings, lampposts, etc.) information that is useful for path optimization, and particularly with respect to 3G, 4G, and newer 5G networking. Implementation of such morphology modeling information and data is described further below with respect to FIG. 9. Morphology modeling techniques are also described in greater detail in U.S. Pat. No. 10,367,577.

In some embodiments, MDB 804 may also provide traffic data to system 800 that may then be apportioned to the respective conventional and quantum processors to optimally compute, simulate, or emulate expected user traffic patterns, which may significantly influence the direction of mobile devices to respective stations. Implementation of such traffic pattern information is described further below with respect to FIG. 10. The MDB traffic data, for example, may be initially provided to the conventional computer portion, which uses this traffic data to better formulate (i.e., reduce the complexity of) the overall radio resource problem to be solved by the hybrid system.

Accordingly, the further implementation of MDB 804, in coordination with SAS 802, thus further reduces the computational complexity of path optimization for both the conventional and quantum computer portions of the hybrid system. Nevertheless, as shown herein, SAS 802 and MDB 804 may be independently utilized with system 100, or may be integrated together, as described above.

For ease of explanation, SAS 802 is described above as being a separate and remote component from hybrid system 100. The person of ordinary skill in the art will understand, however, that this particular configuration is for illustrative purposes, and is not intended to be limiting. In some embodiments, quantum computer 103 and SAS 802 may be integrated within a single quantum/SAS subsystem 810.

Furthermore, SAS 802 is also described, for illustrative purposes, as being in substantially direct communication with RRM 116. The person of ordinary skill in the art will further understand that SAS may additionally (or alternatively) be in communication with one or more BSs 130, a mobile core, a CU, or a relevant top-of-stack communication network component. For ease of illustration, the embodiments described below with respect to FIGS. 9 and 10 depict SAS 802 and MDB 804 as being in operable communication with RRM 116.

Figure 9:
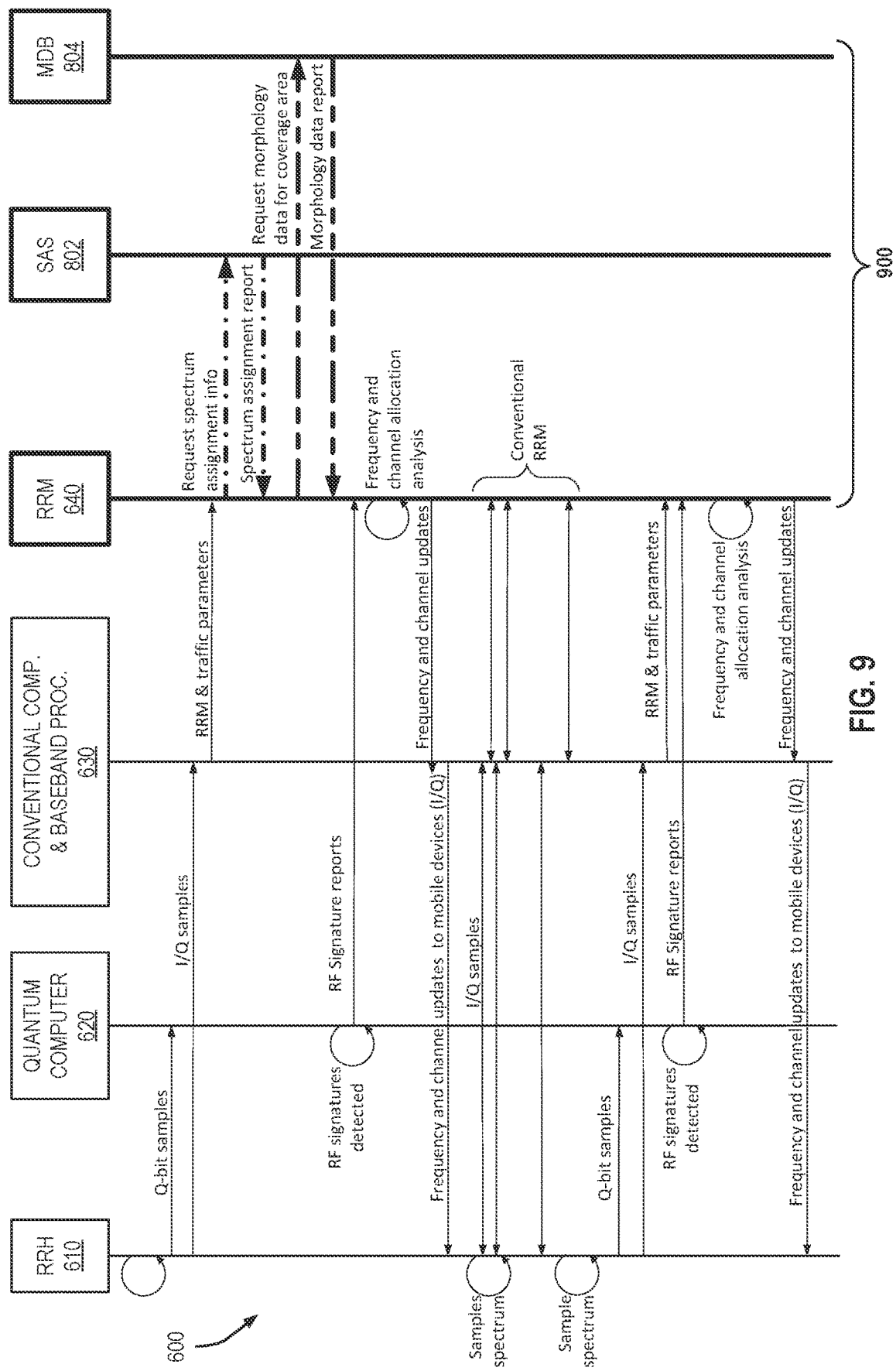
FIG. 9 depicts a network control process flow for the signal detection communication diagram depicted in FIG. 6.
Figure 10:
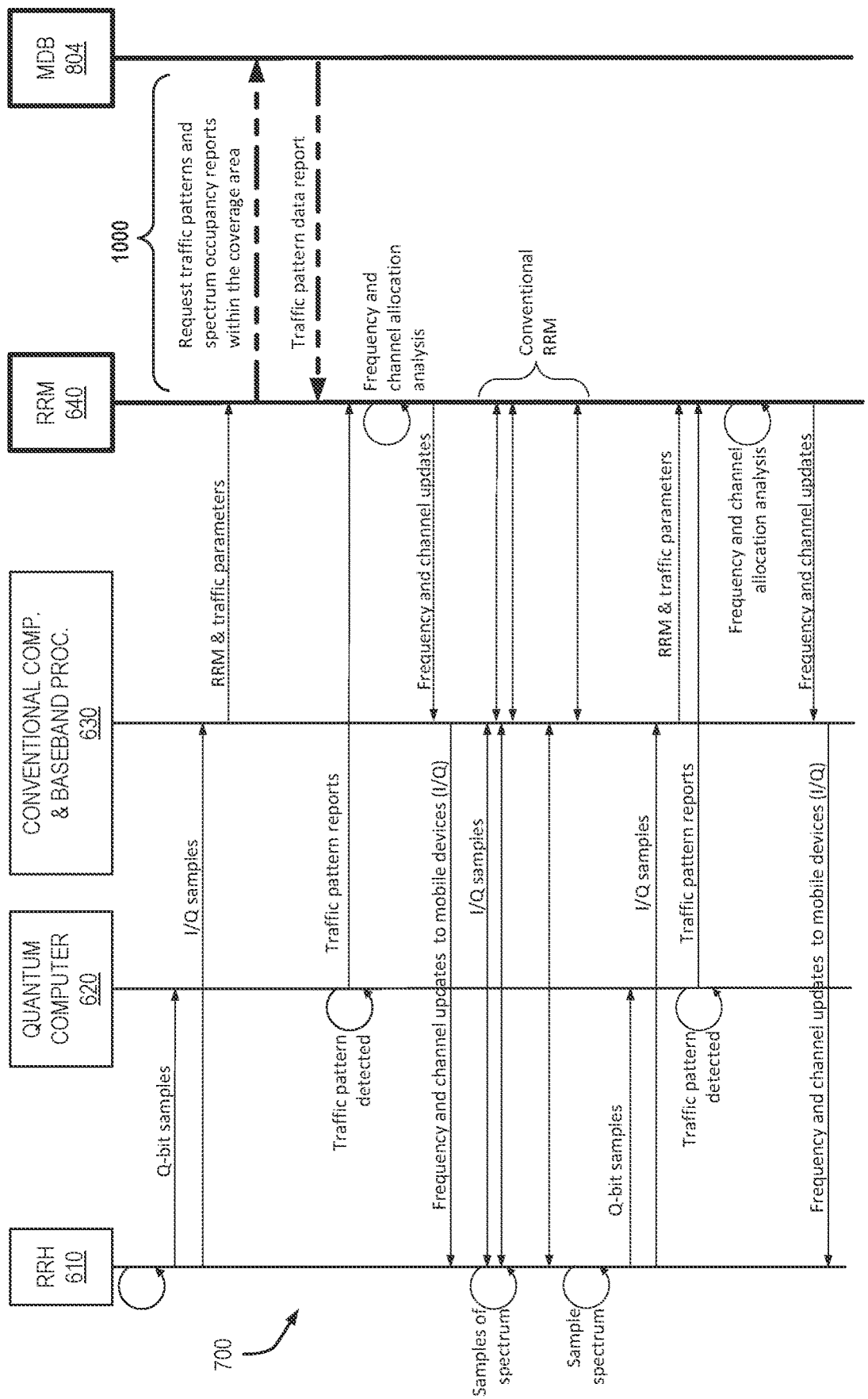
FIG. 10 depicts a network control process flow for the traffic pattern detection communication diagram depicted in FIG. 7.

FIG. 9 depicts a network control process flow 900 for signal detection communication diagram depicted in FIG. 6. Process flow 900 illustrates an exemplary processing order of communication between RRM 116 and SAS 802 on the one hand, and between RRM 116 and MDB 804, on the other hand. In the exemplary embodiment depicted in FIG. 9, optimization of process flow 900 is illustrated with respect to implementation of both SAS 802 and MDB 804. The person of ordinary skill in the art though, will understand that process flow is also illustrative of the operation of only one or the other of SAS 802 and MDB 804. Furthermore, in at least one embodiment, the process flow shown between MDB 804 and RRM 116 may alternatively occur between MDB 804 and SAS 802 (i.e., indirect communication path 808, FIG. 8).

In an exemplary embodiment, communication between RRM 116 and SAS 802 is two-way. For example, RRM 116 may request spectrum assignment information from SAS 802, and SAS 802 may respond to RRM 116 by transmitting a spectrum assignment report, which may provide spectrum and transmission power parameters and limitations that will enable reduction in the computational complexity by hybrid system 100. The person of ordinary skill in the art will understand though, that the request for spectrum assignment information from RRM 116 is optional, and that SAS 802 may be configured to proactively transmit the spectrum assignment report, or other relevant transmission data, to RRM 116 on a periodic basis, and/or as the relevant information contained therein is updated.

In a similar manner, communication between RRM 116 and MDB 804 may also be two-way. For example, RRM 116 (or SAS 802, in the indirect embodiment) may request from MDB 804 morphology data regarding the coverage area of system 800, and MDB 804 may respond to RRM 116 by transmitting a morphology data report including the topographical and related data described above. The person of ordinary skill in the art will understand though, that the request for morphology data from RRM 116 is also optional, and that MDB 804 may also be configured to proactively transmit the morphology data report to RRM 116 on a periodic basis, and/or when updated.

In the exemplary embodiment depicted in FIG. 9, the respective communications between RRM 116 and SAS 802/MDB 804 are illustrated to occur once within the entire cycle of process flow 900. This depiction, however, is provided by way of illustration, and not in a limiting sense. Respective communications between RRM 116 and SAS 802/MDB 804 may occur repeatedly within a single cycle. In an exemplary embodiment, RRM 116 will receive at least one of the spectrum assignment report and the morphology data report prior to RRM 116 performing the respective frequency and channel allocation analyses steps. That is, in this example, if a spectrum assignment report or a morphology data report is not received prior to RRM 116 performing frequency and channel updates, RRM 116 may wait until the next cycle to request or consider a received report. In at least one embodiment, the morphology data report is received prior to the first Qbit sample. Additionally, the morphology data report may also be received prior to reception of the spectrum assignment report.

FIG. 10 depicts a network control process flow 1000 for traffic pattern detection communication diagram 700, FIG. 7. Process flow 1000 is similar to process flow 900, FIG. 9, illustrates an exemplary processing order of communication between RRM 116 and MDB 804. Process flow 1000 differs from process flow 900 though, in that process flow 1000 relates only to the traffic data parameters relevant to the computational complexity of hybrid system 100.

In the exemplary embodiment depicted in FIG. 10, optimization of process flow 1000 is illustrated with respect to two-way communication between MDB 804 and RRM 116 for ease of explanation. That is, in this example, RRM 116 may request from MDB 804 traffic pattern data in spectrum occupancy reports within the coverage area of system 800, and MDB 804 may respond to RRM 116 by transmitting a traffic pattern data report including the relevant requested data. The person of ordinary skill in the art will understand though, that this request from RRM 116 is also optional, and that MDB 804 may be further configured to proactively transmit the traffic pattern data and spectrum occupancy reports to RRM 116 on a periodic basis, and/or when such information has been updated.

Also similar to process flow 900, FIG. 9, communication between RRM 116 and MDB 804 in process flow 1000 is also illustrated to occur once within the cycle of process flow 1000 by way of illustration, and not in a limiting sense. Similar to the embodiment depicted in FIG. 9, traffic pattern communications between RRM 116 and MDB 804 may also occur repeatedly within a single cycle. In an exemplary embodiment, RRM 116 will also receive the traffic pattern data report prior to RRM 116 performing the respective frequency and channel allocation analyses steps, and prior to RRM 116 performing frequency and channel updates, or RRM 116 may wait until the next cycle to request or consider the traffic pattern report.

The exemplary system architecture depicted above with respect to FIG. 8 is also provided by way of example, and not in a limiting sense. It is understood that, in this particular field, the SAS (e.g., SAS 802) is typically remote from individual mobile network operators (MNOs), whereas an MDB (e.g., MDB 804) is typically operated by a single MNO. Multiple-MNO alternatives are illustrated below with respect to FIG. 11.

Figure 11:
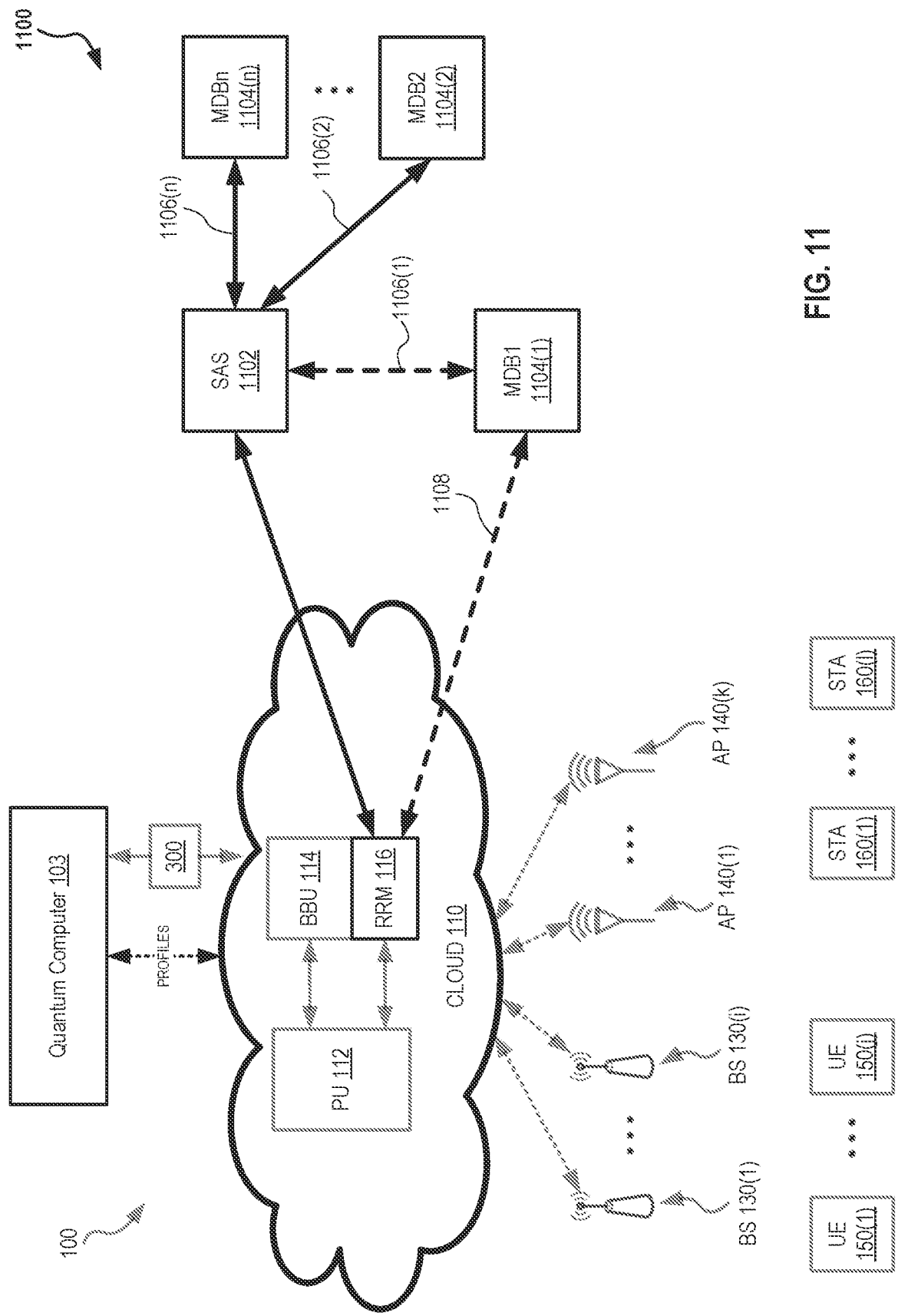
FIG. 11 is a schematic illustration of an alternative network control system for the hybrid computing system depicted in FIG. 1.

FIG. 11 is a schematic illustration of an alternative network control system 1100 for hybrid computing system 100, FIG. 1. Network control system 1100 is similar to network control system 800, FIG. 8. Different from network control system 800, network control system 1100 illustrates an architectural configuration using a single SAS 1102, but multiple MDBs 1104 (i.e., 1-n).

In this example, each of the multiple MDBs 1104 is considered to be operated by a different operator/MNO which are presumed to not directly communicate or coordinate with one another. According to the exemplary embodiment depicted in FIG. 11 though, an individual operator is able to utilize the information from other operators through SAS 1102. More specifically, SAS 1102 is configured for respective direct communication paths 1106 to the multiple MDBs 1104 (or to the information from the respective MDB 1104 through the RRM of that particular operator in communication therewith). Through this innovative configuration, network control system 1100 more efficiently enables its respective RRUs to manage their power levels and spectrum allocation. According to the exemplary embodiment, SAS 1102 advantageously communicates with MDBs 1104 from multiple MNOs, and thereby is able to more effectively reconcile the different information that may be received from MDBs 1104 that may represent overlapping coverage areas.

In the exemplary embodiment depicted in FIG. 8, all of MDBs 1104 are illustrated to communicate with SAS 1102 over respective indirect communication paths 1106. However, in the case where one particular MDB 1104 (i.e., MDB 1104(1)) may be operated by the same MNO which operates system 1100 (or system 100), that particular MDB 1104(1) may alternatively communicate with RRM 116 over a direct communication path 1108, instead of with SAS 802 over indirect communication path 1106(1), whereas the other MDBs 1104(2-n) will still communicate with SAS 802 over their respective indirect communication paths 1106.

The embodiments described above thus provide innovative systems and methods for implementing an SAS in a conventional-quantum hybrid system for improving wireless network radio resource management. According to the exemplary techniques herein, the information from the SAS is particular useful to formulate the radio resource management problem to be solved by the respective conventional and quantum computer systems, both individually and together, to significantly increase the computational accuracy, while also greatly decreasing the computational complexity.

The innovative implementation of a morphology data base to the conventional-quantum hybrid computing system still further increases the computational accuracy and decreases the computational complexity of the hybrid system, through use of morphology and traffic pattern data that similarly assists in the formulation of the radio resource management problem to be solved by the conventional and quantum computer system. Whereas either of the SAS and the MDB may be implemented individually to achieve such advantageous results, the combined implementation of an SAS with one or MDBs further reduces the computational complexity of the problem to be solved by the hybrid system in an exponential fashion.

Exemplary embodiments of systems and methods for quantum computing applications are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A wireless communication system, comprising:
   a spectrum access subsystem (SAS) configured to collect spectrum assignment information from the wireless communication system;
   a feedback processing unit for analyzing the collected spectrum assignment information from the SAS;
   a problem-type processor in operable communication with the feedback processing unit, and configured to (i) analyze the collected spectrum assignment information to determine whether the collected spectrum assignment information presents one of a computational polynomial time problem and a non-deterministic polynomial-time hard (NP-hard) problem, and (ii) transmit problem-specific data based on the determination;
   a communications processor in operable communication with the problem-type processor, the communications processor including a radio resource management subsystem (RRM) and configured to process polynomial time problem data from the transmitted problem-specific data;
   a quantum computer in operable communication with the problem-type processor, and configured to process NP-hard problem data received from the transmitted problem-specific data; and
   a first morphology data base (MDB) configured to (i) communicate with at least one of the SAS and the RRM, (ii) collect morphology data of the wireless communication network including one or more of three-dimensional topology data, radio frequency (RF) propagation data, traffic pattern data, and spectrum occupancy data, and
   wherein the SAS is configured to communicate with the RRM.

2. The system of claim 1, wherein the communications processor comprises a cloud computing system.

3. The system of claim 1, wherein the transmitted problem-specific data comprises binary data information.

4. The system of claim 3, further comprising a quadratic unconstrained binary optimization (QUBO) unit interposed between the problem-type processor and the quantum computer.

5. The system of claim 1, wherein the collected spectrum assignment information includes one or more of spectrum allocation data and transmission power parameters.

6. The system of claim 1, wherein the NP-hard problem comprises one or more of a mixed integer nonlinear problem (MINLP) and a quadratic semi-assignment problem (QSAP).

7. The system of claim 1, wherein the SAS is disposed remotely from the quantum computer.

8. The system of claim 1, wherein the SAS is integrally included with the quantum computer.

9. A wireless communication system, comprising:
   a spectrum access subsystem (SAS) configured to collect spectrum assignment information from the wireless communication system;
   a feedback processing unit for analyzing the collected spectrum assignment information from the SAS;
   a problem-type processor in operable communication with the feedback processing unit, and configured to (i) analyze the collected spectrum assignment information to determine whether the collected spectrum assignment information presents one of a computational polynomial time problem and a non-deterministic polynomial-time hard (NP-hard) problem, and (ii) transmit problem-specific data based on the determination;
   a communications processor in operable communication with the problem-type processor, the communications processor including a radio resource management subsystem (RRM) and configured to process polynomial time problem data from the transmitted problem-specific data; and
   a quantum computer in operable communication with the problem-type processor, and configured to process NP-hard problem data received from the transmitted problem-specific data; and
   a first morphology data base (MDB) configured to communicate with at least one of the SAS and the RRM,
   wherein the SAS is configured for communication with (i) the RRM, and (ii) a second MDB different from the first MDB, wherein the second MDB is located remotely and operated separately from the wireless communication network.

10. The system of claim 1, wherein the problem-type processor is further configured to analyze the collected morphology data to determine whether the collected morphology data presents one of a computational polynomial time problem and a non-deterministic polynomial-time hard (NP-hard) problem.

11. The system of claim 9, wherein the first MDB is configured to collect morphology data of the wireless communication network including one or more of three-dimensional topology data, radio frequency (RF) propagation data, traffic pattern data, and spectrum occupancy data.

12. The system of claim 1, further configured to output at least one optimum communication path solution based on the NP-hard problem data processed by the quantum computer.

* * * * *